(12) United States Patent
Perkowitz et al.

(10) Patent No.: US 8,429,099 B1
(45) Date of Patent: Apr. 23, 2013

(54) DYNAMIC GAZETTEERS FOR ENTITY RECOGNITION AND FACT ASSOCIATION

(75) Inventors: Michael Perkowitz, Seattle, WA (US); Kevin Francis Eustice, Seattle, WA (US); Steven M. Reed, Seattle, WA (US); Jonathan D. Lazarus, Mercer Island, WA (US); Kenneth Dwight Krossa, Kirkland, WA (US)

(73) Assignee: ARO, Inc., Seattle, WA (US)

( * ) Notice: Subject to any disclaimer, the term of this patent is extended or adjusted under 35 U.S.C. 154(b) by 330 days.

(21) Appl. No.: 12/904,957

(22) Filed: Oct. 14, 2010

(51) Int. Cl.
*G06F 15/18* (2006.01)
*G06F 7/00* (2006.01)

(52) U.S. Cl.
USPC .......................................... 706/12; 707/705

(58) Field of Classification Search .................. None
See application file for complete search history.

(56) References Cited

U.S. PATENT DOCUMENTS

| | | | |
|---|---|---|---|
| 5,345,551 A | 9/1994 | Shelley et al. | |
| 6,366,922 B1 | 4/2002 | Althoff | |
| 6,370,554 B1 | 4/2002 | Sun-Woo | |
| 6,816,863 B2 | 11/2004 | Bates et al. | |
| 6,985,926 B1 | 1/2006 | Ferlauto et al. | |
| 7,249,123 B2 | 7/2007 | Elder et al. | |
| 7,428,579 B2 | 9/2008 | Libbey et al. | |
| 7,565,403 B2 | 7/2009 | Horvitz et al. | |
| 7,634,528 B2 | 12/2009 | Horvitz et al. | |
| 7,693,827 B2* | 4/2010 | Zamir et al. | 707/999.003 |
| 7,885,948 B2 | 2/2011 | Johnson et al. | |
| 7,890,596 B2 | 2/2011 | Guy | |
| 8,200,676 B2* | 6/2012 | Frank | 707/749 |
| 2003/0193481 A1 | 10/2003 | Sokolsky | |
| 2005/0057584 A1 | 3/2005 | Gruen et al. | |
| 2005/0261011 A1 | 11/2005 | Scott | |
| 2005/0267944 A1 | 12/2005 | Little | |
| 2006/0112146 A1 | 5/2006 | Song et al. | |
| 2006/0149710 A1* | 7/2006 | Koningstein et al. | 707/3 |
| 2006/0173957 A1 | 8/2006 | Robinson et al. | |
| 2006/0195533 A1 | 8/2006 | Isozaki et al. | |
| 2006/0235873 A1 | 10/2006 | Thomas | |
| 2006/0294134 A1 | 12/2006 | Berkhim et al. | |
| 2007/0005654 A1 | 1/2007 | Schachar et al. | |
| 2007/0011236 A1 | 1/2007 | Ravula | |
| 2007/0271272 A1 | 11/2007 | McGuire et al. | |
| 2008/0005249 A1 | 1/2008 | Hart | |
| 2008/0059576 A1 | 3/2008 | Liu et al. | |
| 2008/0109751 A1 | 5/2008 | Fitzmaurice et al. | |
| 2008/0228947 A1 | 9/2008 | Markus et al. | |
| 2009/0006994 A1 | 1/2009 | Forstall et al. | |

(Continued)

OTHER PUBLICATIONS

United States Patent and Trademark Office, Final Rejection, U.S. Appl. No. 12/512,752, Sep. 13, 2012, 51 pages.

(Continued)

*Primary Examiner* — Alan Chen
(74) *Attorney, Agent, or Firm* — Fenwick & West LLP

(57) ABSTRACT

An entity recognition model is trained to use gazetteers to recognize entities referenced in documents. When a document associated with a user is received for recognizing entities referenced therein, a gazetteer is selected based on user contexts associated with the user. The document is analyzed using the gazetteer according to the entity recognition model to recognize an entity referenced therein. Additional facts associated with the recognized entities and actions applicable to the recognized entities are provided to enable the user to perform the applicable actions against the recognized entity.

19 Claims, 4 Drawing Sheets

U.S. PATENT DOCUMENTS

2009/0055355 A1 2/2009 Brunner et al.
2009/0077056 A1 3/2009 Ravikumar et al.
2009/0094021 A1 4/2009 Marvit et al.
2009/0099901 A1* 4/2009 Sah et al. .................. 705/10
2009/0171937 A1 7/2009 Chen et al.
2009/0187537 A1 7/2009 Yachin et al.
2009/0327271 A1 12/2009 Amitay et al.
2012/0078884 A1 3/2012 Callari et al.
2012/0278341 A1* 11/2012 Ogilvy et al. .............. 707/749

OTHER PUBLICATIONS

Information Technology Services, College of Architecture, Texas A&M University, "How to Schedule Rooms in Microsoft Entourage," 2009 [Online] [Retrieved Jul. 29, 2010] Retrieved from the Internet ,<URL: http://its.arch.tamu.edu/content/support/documentation/mail/entourage/entourage-room-scheduling>.

Microsoft Corporation, "Work with Time Zones in Outlook," 2010 [Online] [Retrieved on Jul. 29, 2010] Retrieved from the Internet , <URL:http://office.microsoft.com/en-us/outlook-help/work-with-time-zones-in-outlook-HA001056530.aspx.>.

PCT International Search Report and Written Opinion, PCT Application No. PCT/US2010/020134, May 19, 2010, 7 pages.

PCT International Search Report and Written Opinion, PCT Application No. PCT/US2009/052313, Sep. 3, 2009, 7 pages.

PCT International Search Report and Written Opinion, PCT Application No. PCT/US2009/052311, Sep. 15, 2009, 6 pages.

* cited by examiner

DYNAMIC GAZETTEERS FOR ENTITY RECOGNITION AND FACT ASSOCIATION

CROSS-REFERENCE TO RELATED APPLICATION

This application is related to U.S. patent application Ser. No. 12/512,752, filed Jul. 30, 2009, entitled "Social Network Model For Semantic Processing", which is incorporated by reference in its entirety.

BACKGROUND

1. Field of the Invention

The present disclosure generally relates to the field of information recognition, in particular to recognizing entities referenced in text.

2. Description of the Related Art

Electronic content often includes references to related entities such as people, organizations, and locations. It is beneficial to recognize the referenced entities because such recognition can lead to an enhanced viewer experience. For example, a viewer of the electronic content can be given the option of performing certain applicable actions against a recognized entity (e.g., visiting the homepage of a recognized organization). In addition, the electronic content can be indexed according the entities recognized therein to enhance subsequent data retrieval for the recognized entities.

Certain entities are hard to recognize due to factors such as recency and uncommonness. Examples of such entities include people with uncommon names, people that have recently become public figures, and small cities. Therefore, there is a need for a way to boost the ability to recognize entities referenced in electronic content.

SUMMARY

Embodiments of the invention recognize entities referenced in documents. According to one aspect, a document associated with a user is received for recognizing entities referenced therein. An entity recognition engine selects a gazetteer based on user contexts associated with the user and analyzes the document using the gazetteer to recognize an entity referenced therein. Additional facts associated with the recognized entities and actions applicable to the recognized entities are provided to enable the user to perform the applicable actions against the recognized entity.

According to another aspect, the entity recognition model is trained to use gazetteers to recognize entities referenced in a training corpus. The gazetteers are subsequently modified. The entity recognition model can use the subsequently modified gazetteers to recognize entity references without being retrained.

BRIEF DESCRIPTION OF THE DRAWINGS

Figure (FIG. 1 is a high-level block diagram of the computing environment, in accordance with one embodiment.

One skilled in the art will readily recognize from the following discussion that alternative embodiments of the structures and methods illustrated herein may be employed without departing from the principles described herein.

DETAILED DESCRIPTION OF THE EMBODIMENTS

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Computing Environment

Figure 1:
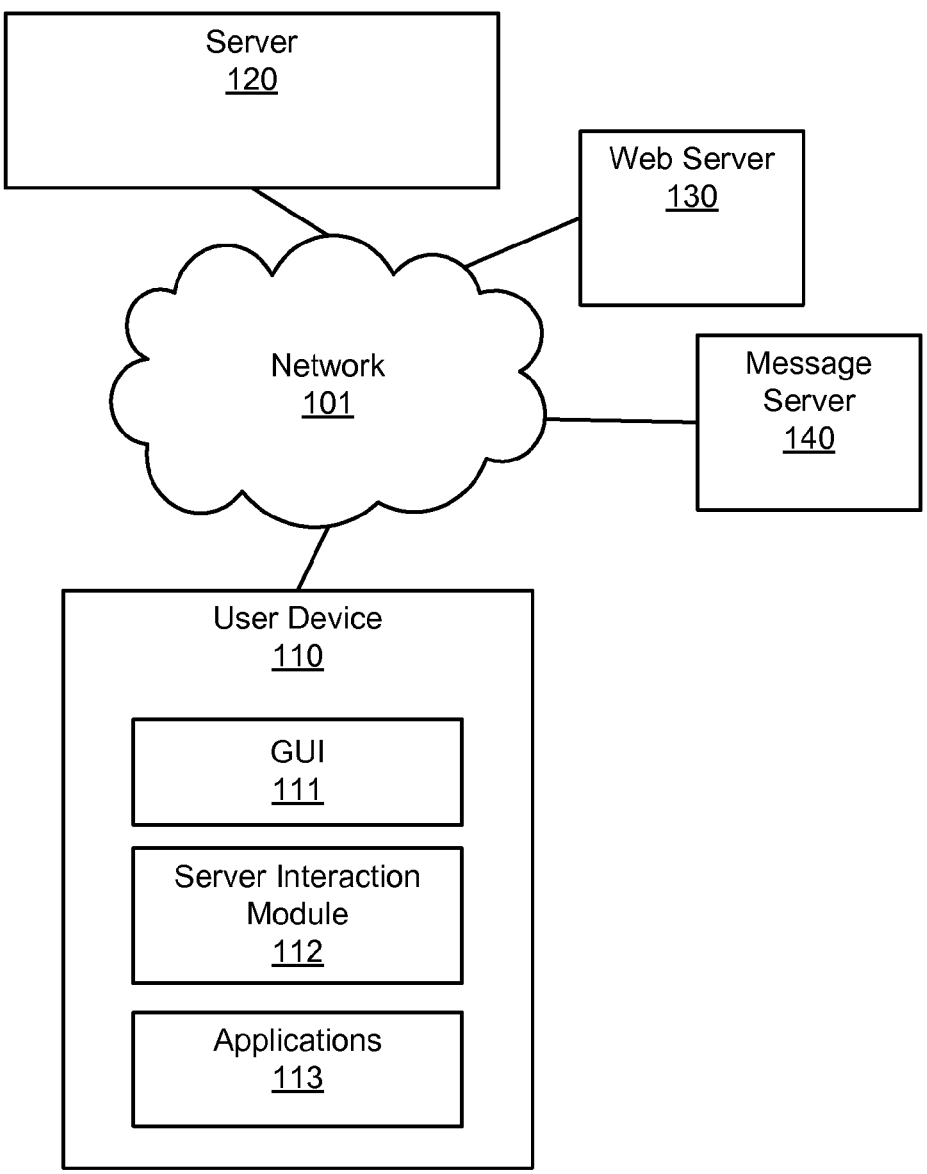

FIG. 1 is a high-level block diagram of the computing environment 100 in accordance with one embodiment. The computing environment 100 includes a server 120 that is connected via a network 101 to a user device 110. The network 101 is a communications network such as a local area network, a wide area network, a wireless network, an intranet, or the Internet. In one embodiment, the computing environment 100 also includes a web server 130 that serves web pages to the user device 110 and a message server 140 that serves messages such as emails or Short Message Service (SMS) messages to the user device 110. Although only one user device 110 and a limited number of servers are shown in FIG. 1 for clarity, any number and type of user devices and server configurations may be connected to the network 101.

In one embodiment, data flowing to and from the user device 110 passes through the server 120. For ease of reference, the term "document" is used herein to refer to a discrete collection of data, such as a file, an email, a web page, a message, an appointment request, or any other type of electronic document. The server 120 analyzes the document flowing to and from the user device 110 in order to recognize entities referenced therein. The server 120 selects gazetteers based on user contexts and user choices, and uses the selected gazetteers to recognize the entity references. Because the gazetteers selected for a user may be developed using the user's personal data or otherwise tailored to recognize entities relevant to the user, the server 120 may recognize entities with unusual names or are otherwise hard to recognize. The server 120 passes information (also called "facts") associated with the entities to the user device 110 so that the user device 110 can enable the user to perform actions applicable to the recognized entities.

In various embodiments, the user device 110 may be any device capable of communicating over the network 101. Examples of a user device 110 include a personal digital assistant (PDA), a mobile phone such as a smart phone, a laptop, a desktop computer, and a computer with limited external user interfaces (such as a television set-top box or in-store computer kiosk). In one embodiment, the user device 110 is a mobile device that offers broad functionality. For example, the mobile device may send and receive SMS messages and emails, offer web access, provide GPS functionality, manage contact information, track calendar appointments, and manage and communicate other types of documents.

The user device 110 has a graphical user interface (GUI) 111 that allows a user to access and interact with data stored on the user device 110 and data received from the server 120 to make use of the device's functionality. The GUI 111 allows the user to select information, for example, by clicking on it, touching it, highlighting it with a cursor, or any other method of selecting a portion of the displayed information. Once the user selects an entity reference, the GUI 111 makes available actions that the user may perform against the entity being referenced. For example, the GUI 111 may display a node menu containing the actions. The node menu includes an anchor node surrounding the entity reference with edges radiating outward and connecting to nodes representing the actions. For example, assume the user is using the user device 110 to view an email that contains an acquaintance's name. The GUI 111 displays the acquaintance's name in a manner different from surrounding text (e.g., underlined or highlighted) to indicate that the name references an entity, in this case the acquaintance. If the user selects the acquaintance's name, the GUI 111 displays a node menu providing the user with applicable actions such as calling/emailing the acquaintance.

In addition to the GUI 111, the user device 110 includes various applications 113 that support the functionality of the user device 110. For example, the user device 110 may include telephone, email, calendar, contact manager, browser, GPS, word processing, spreadsheet, and/or other business or personal applications 113. Users of the user device 110 may create, receive, send, access, store, or otherwise interact with documents through the applications 113.

The user device 110 also includes a server interaction module 112 to manage the communications between the server 120 and the user device 110. Specifically, the server interaction module 112 receives documents sent to the user device 110 from the server 120, including, in one embodiment, metadata identifying entities recognized therein and associated facts. The server interaction module 112 also receives data to be sent to the server 120 from the user device 110, for example outbound emails and text messages.

Computer Architecture

The entities shown in FIG. 1 are implemented using one or more computers.

Figure 2:
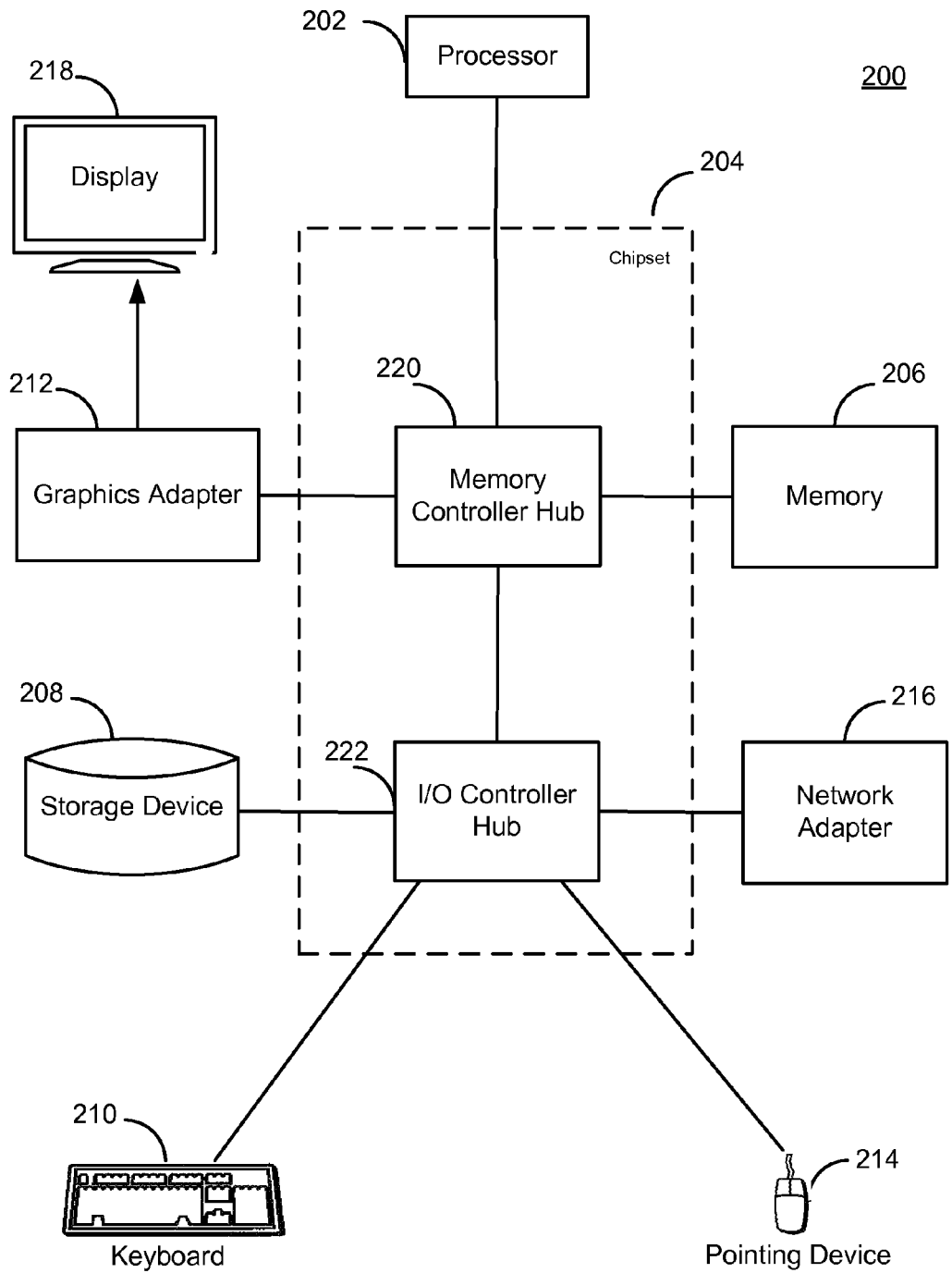
FIG. 2 is a high-level block diagram illustrating an example of a computer for use as a user device or server, in accordance with one embodiment.

FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" (or "engine", "model") refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, one or more of the servers 120, 130, 140 might comprise multiple blade servers working together to provide the functionality described herein. As another example, the user device 110 might comprise a smartphone with limited processing power. The computers 200 can lack some of the components described above, such as keyboards 210, graphics adapters 212, and displays 218. In addition, one or more of the servers 120, 130, 140 can run in a single computer 200 or multiple computers 200 communicating with each other through a network such as a server farm.

Example Architectural Overview of the Server

Figure 3:
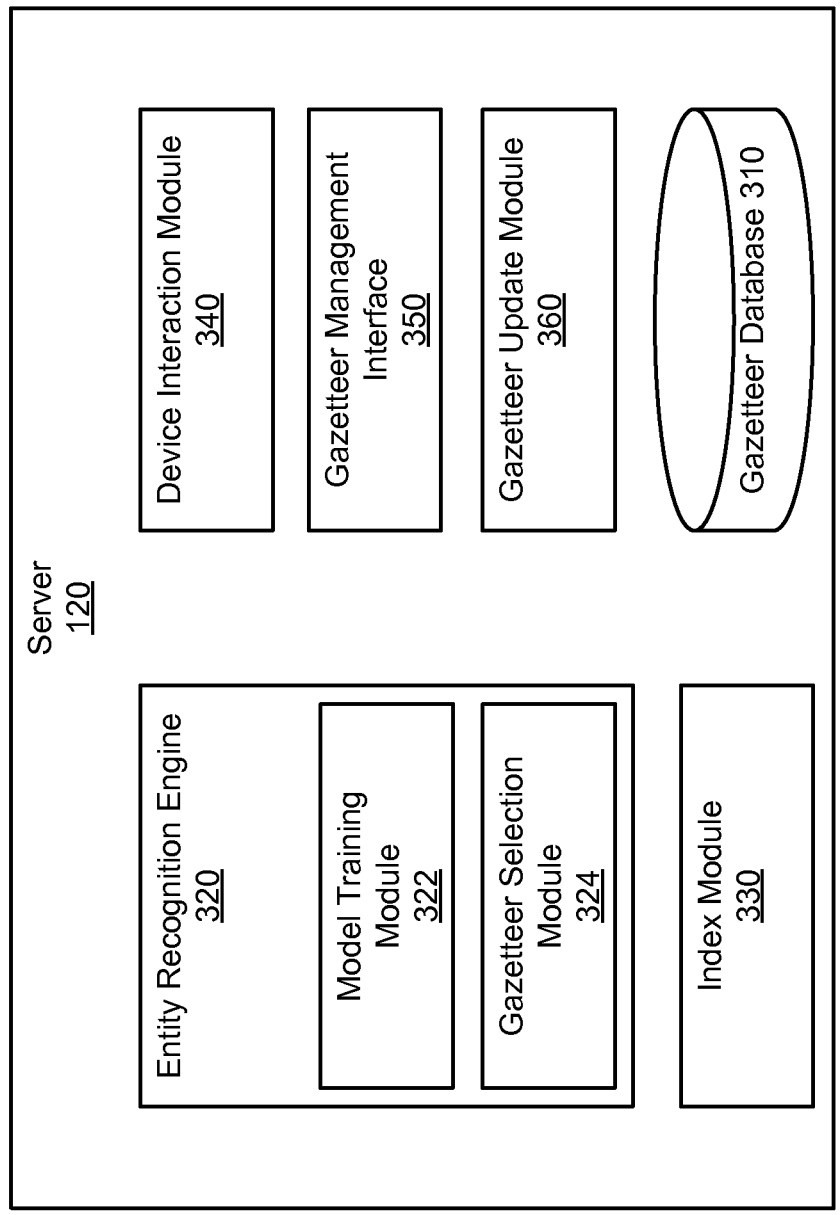
FIG. 3 is a block diagram of a server, in accordance with one embodiment.

FIG. 3 is a block diagram of a server 120, in accordance with one embodiment. As mentioned above, the server 120 analyzes documents flowing to and from the user device 110 in order to recognize entities referenced therein. The server 120 passes information related to the recognized entities to the user device 110 so that the user device 110 can provide applicable user actions against the recognized entities. In this example, the server 120 includes a gazetteer database 310, an entity recognition engine 320, an index module 330, a device interaction module 340, a gazetteer management interface 350, a gazetteer update module 360.

The gazetteer database 310 stores a collection of gazetteers used by the server 120 to recognize entity references in documents. A gazetteer is a structured collection of data developed for recognizing entity references in documents. An entity is a thing which has a distinct existence as an individual unit, such as a person, an organization, or a location, for example. Entities are categorized into different entity types, such as people types, organization types, and location types. An entity type is associated with a schema, which specifies a plurality of labeled facts associated with entities of the entity type. A fact can be a referencing fact (also called a "name" or an "alias") that can be used to reference the associated entity, or a non-referencing fact that typically is not used to reference the associated entity. For example, a person can be associated with referencing facts such as a first name, a last name, a nickname, and an alias, and non-referencing facts such as a phone number, an employer, and a Uniform Resource Locator (URL) of a personal homepage. In one embodiment, each entity in a gazetteer may be associated with multiple aliases, which collectively define a list of ways the entity may be referred to in text. These aliases may be provided by, for example, the entities themselves, by volunteers contributing information to a collection, by workers paid to discover or suggest aliases, or by an automated process. In one embodiment, aliases may additionally be generated using a set of rules. For example, rules for generating organization aliases may specify that common suffixes such as "bar and grill" may be dropped from organization names to create aliases.

A fact may include one or more references to other entities of the same entity type or different entity types. For example, a movie entity may be associated with a fact labeled "director" that references the director of that movie. A schema may also define a set of actions applicable to the specified facts of the associated entity type. For example, an action applicable to a fact labeled "stock symbol" is looking up the stock price. Other example actions include calling (e.g., for a fact labeled "telephone number"), emailing (e.g., for a fact labeled "email address"), and sending an SMS message (e.g., for a fact labeled "mobile telephone number"). Schemas can be provided by authoritative external sources or, as described in further detail below, specified in gazetteers.

An action can be defined as a URL (e.g., a URL directing to the appropriate web server providing the corresponding service and including the appropriate parameters). Alternatively or additionally, an action can be specified using features such as the "intent" feature provided in platforms such as the Google Android™ platform that will invoke an application running on the platform to perform the specified intent. Alternatively or additionally, an action can be specified as an abstract representation that is bound to a concrete, client-specific implementation, such as URLs, intents, API calls to external services, or any arbitrary code on the rendering device (e.g., the user device 110). If a schema defines a fact relating to other entities, a "relate to" action can be defined in the schema to explore the related entities. For example, the schema for movie type entities may relate movies to actors/actresses in the movies through a fact labeled "actors/actresses", and define a "relate to" action for users to access information about the related actors/actresses of a movie.

Facts associated with an entity are stored together and collectively called an entity model. For example, entity models for major organizations (e.g., governments, corporations, and nongovernmental organizations (NGOs)) include facts such as alternate names, acronym expansion, subsidiary companies, official mailing addresses and web sites, Wikipedia page URLs, stock exchange ticker symbols, and areas of industry. Facts in the entity models can be provided by authoritative external sources, extracted from user data, or, as described in further detail below, specified in gazetteers. Entity models for entities of a specific entity type are stored together (e.g., in one or more database tables).

A gazetteer includes a list of terms (or words, phrases) commonly used in a referencing fact of a specific entity type, and is used for recognizing instances of the referencing fact in documents. For example, a common last name gazetteer includes a list of common last names. The list of terms in a gazetteer is also called the reference list of that gazetteer. The presence of a particular term in a reference list of a gazetteer serves as an indicator that the term references an entity of the associated entity type. A reference list may include additional information supplemental to the terms. For example, the reference list of the common last name gazetteer may include weights reflective of the frequency the included last names occur in the population. A gazetteer may also include a collection of graphic or GUI elements for presenting entities recognized using the gazetteer. These graphic elements may include icon images for entity types and/or actions defined.

A gazetteer may include a set of rules (called "filter rules") specifying how to recognize entities using the reference list to reduce false positive recognitions. For example, a filter rule may specify that reference names in the reference list consisting of a single common word (e.g. "apple") should be ignored unless adjacent to appropriate context-specific words (e.g., "inc.", "incorporated", "LLC"). Other example context-specific terms in filter rules include common prefixes indicative of people (e.g., "Mr.", "Mrs.", "Ms.", etc.). Other filter rules may require that the name be capitalized in order to count as a match (e.g. "Will Park" might count as a person while "will park" would not). Yet other additional or alternative context-specific filter rules might add additional document contexts that would have to be satisfied for the entity reference to be recognized, such as requiring a set of terms to completely or partially co-occur in the target document. Still other filter rules may filter out reference names composed of common words or phrases (e.g. disallowing an organization called "Of The").

In one embodiment, a gazetteer may specify a schema (or a portion of the schema) for the associated entity type. The schema may specify actions applicable to the referencing fact the gazetteer is designed to recognize, as well as other facts specified in the schema. For example, the schema in a gazetteer for recognizing disease names may specify an action of identifying corresponding treatments/medications; the schema in a gazetteer for recognizing local restaurant names may specify actions such as calling, mapping, and making a reservation; the schema in a gazetteer for recognizing people's last names may specify actions such as calling, emailing, and sending an SMS message; and the schema in a gazetteer for recognizing movie names may specify actions such as displaying show times and purchasing tickets.

In one embodiment, a gazetteer may include (or provide reference to) facts associated with entities referenced in the reference list. For example, a gazetteer for names of the fifty states in the U.S. may include facts such as the state capitals, populations, and/or governors. As another example, a local restaurant name gazetteer may include facts such as the phone numbers, street addresses, and business hours. These facts can be used to enable actions against the entities referenced in the reference list—making a phone call, mapping an address, performing a general or domain-specific search, to name a few. The facts can also be used to populate the corresponding entity models. Because a gazetteer can specify a schema for an entity type and provide related facts, a gazetteer can define a new entity type or augment an existing entity type with additional facts/actions for entities of that type. A gazetteer can be expressed in many different possible representations, such as, for example, an XML data structure, a JSON data structure, or a database table.

A gazetteer may be developed to target a specific user (user-specific gazetteer), or a specific set of users to boost the ability to recognize entities for that specific user(s). For example, a user-specific gazetteer for recognizing people names can be created for each user containing names of people found in that user's own personal data including contacts and past emails to or from the user. The user-specific gazetteers may also include user-specific facts associated with the entities referenced in the reference lists. For example, the user-specific people name gazetteer may include the full names, addresses, and telephone numbers of people from contacts stored by a contacts manager application 113 of the user device 110 or from the user's social network model. The social network model is a description of the relationships between entities found in the user's data.

Other specific-purpose gazetteers can be provided for recognizing entities related to some specific purpose, such as a gazetteer for recognizing U.S. movies, a gazetteer for recognizing English baseball terms, and a gazetteer for recognizing Spanish medical terms. These specific-purpose gazetteers can be developed by external sources, such as experts in the field, a business that works in that domain, a community of amateurs, or an individual user. The user-specific gazetteers and specific-purpose gazetteers boost the ability to recognize entities for specific user(s) by providing reference lists tailored to recognize entities of special interest to the user(s), even if such entities have unusual names absent in standard lists of common names, unusual spelling/grammar, or are otherwise insufficient for recognition. In addition, such gazetteers also beneficially provide entity facts that enable the user(s) to perform applicable actions to the recognized entities.

The entity recognition engine 320 recognizes entities referenced in documents flowing to and from the user device 110 by analyzing text in the documents using gazetteers according to an entity recognition model. As shown, the entity recognition engine 320 includes a model training module 322 and a gazetteer selection module 324.

The model training module 322 trains the entity recognition model to effectively use gazetteers to recognize entity references in an extensive general training corpus including emails, web pages, and other types of documents. The documents in the training corpus are first analyzed to detect presence of terms in reference lists of gazetteers, along with other features such as whether the detected terms are capitalized and the preceding/following word. The model training module 322 trains the entity recognition model to recognize entity references in documents in the training corpus based on the features. Some of the documents in the general training corpus have been manually labeled to identify entity references therein, and serve as ground truth for the model training module 322. During the training process, the entity recognition model learns the relative importance and effectiveness of various features in recognizing entity references in the general training corpus. Various techniques may be used by the model training module 322 to train the entity recognition model, such as decision tree induction algorithms. The model training module 322 may train multiple models for different purposes (e.g., one model optimized for efficiency while another model optimized for accuracy).

Once trained, the entity recognition model is used by the entity recognition engine 320 to recognize entity references in documents outside the training corpus. The gazetteers used by the entity recognition model can be modified to include content that is up-to-date or tailored to recognize a specific set of entities (e.g., people or organizations from a user's contacts). As a result, the entity recognition model can use the modified gazetteers (as opposed to the original gazetteers used in the training process) to recognize entities of special interest to a user, even if such entities have unusual names absent in standard lists of common names, unusual spelling/grammar, or are otherwise insufficient for recognition.

To fully utilize gazetteers stored in the gazetteer database 310 to boost the ability of entity recognition, the gazetteer selection module 324 dynamically selects gazetteers based on real-time user contexts for the entity recognition model to recognize entities. For example, when selecting gazetteers, the gazetteer selection module 324 takes into consideration one or more of the following contexts: geographic location contexts, social contexts, and organization contexts. In one embodiment, gazetteers stored in the gazetteer database 310 are organized by context, and the gazetteer selection module 324 selects gazetteers from the gazetteer database 310 based on contexts.

Regarding the geographic location contexts, the gazetteer selection module 324 selects gazetteers associated with geographic locations that are relevant to the user/document, such as the location of the user device 110, a location specified by the user, and a location associated with the underlying document (e.g., an address appearing in the document). An example of a gazetteer associated with a geographic location is a gazetteer for recognizing restaurants (or other businesses) around that location.

Regarding the social contexts, the gazetteer selection module 324 selects gazetteers based on social contexts that are specific to the user (e.g., user-specific gazetteers), as well as non-user-specific social contexts (e.g., specific-purpose gazetteers). For example, the gazetteer selection module 324 selects a user-specific gazetteer developed to recognize people names specific to the user (e.g., based on the user's social network model and/or people with which the user has recently communicated). The gazetteer selection module 324 also selects gazetteers developed for entities associated with the user, such as people names specific to an employer of the user (or other organizations the user belongs to).

Regarding the organization contexts, the gazetteer selection module 324 selects gazetteers based on organizations related to the user. For example, the gazetteer selection module 324 recognizes organizations (e.g., companies, NGOs) based on the related geographic locations and/or the user's affiliations (e.g., as identified in the user's social network model, contacts, message signature blocks). The gazetteer selection module 324 relates organizations with geographic locations using information provided by third party sources.

In addition to selecting gazetteers based on user contexts, the gazetteer selection module 324 may also select other gazetteers such as general gazetteers and gazetteers explicitly selected by the user. General gazetteers include common entity names such as common first/last names, common baby names, famous places/organizations, countries/states/cities, to name a few. In case more than one selected gazetteers are intended to recognizing a same entity type, the gazetteer selection module 324 dynamically merges them into a single gazetteer, such that each selected gazetteer is oriented around a specific entity type.

The entity recognition engine 320 analyzes a user document using the selected gazetteers according to the entity recognition model to recognize entities referenced therein. As described above, a gazetteer may include a set of filter rules designed to reduce false positive entity recognitions. In addition to applying the filter rules of the selected gazetteers, the entity recognition engine 320 may also apply a set of supplemental filter rules to further reduce false positive entity recognitions. For example, if a gazetteer provided by a third-party is for recognizing movie titles, the supplemental filter rules may prevent the gazetteer from recognizing every instance of common words that happen to be movie titles (e.g., "THEM" or other single or two-word movie titles), or require the gazetteer to only match under certain conditions (e.g., movie title lengths must exceed 3 words, or the phrases "movie" and "science fiction" appear in the same document).

The entity recognition engine 320 detects entity references in a document by parsing the document for the presence of terms in the reference lists of the selected gazetteers. The presence of a term in a reference list in the document is a feature considered in the entity recognition model for recognizing references to entities. The entity recognition engine 320 determines the type of the referenced entity based on the entity schema associated with the gazetteer including the detected entity reference, and identifies the entity model associated with the referenced entity (e.g., by matching with entity models).

Once the entity recognition engine 320 successfully recognizes an entity referenced in a document, it may store the recognized entity reference and entity type in a data storage (not shown) and/or communicate it to the user device 110 through the device interaction module 340 of the server 120. The entity recognition engine 320 may also retrieve additional data related to the recognized entity from sources such as the gazetteer and the entity model, and augment the document using such additional data (e.g., by tagging the referencing term) or provide the additional data to the user device 110. Examples of the additional data include applicable actions and facts associated with the recognized entity enabling the applicable actions. The recognized entity reference, entity type, and additional data are collectively referred to as the metadata. As a result of receiving the metadata, the user device 110 (or the GUI 111) provides the user with convenient options of applying the applicable actions against the entity referenced in the document. Additionally, the entity recognition engine 320 may extract information about the recognized entity from the document and build (or modify) the social network model of the user using such information. Additional information for building the social network model using extracted entity information can be found in U.S. patent application Ser. No. 12/512,752, filed Jul. 30, 2009, entitled "Social Network Model For Semantic Processing", which has been incorporated by reference in its entirety.

The index module 330 indexes the data according to the entities recognized by the entity recognition engine 320. In cases where a document contains more than one recognized entity, the document may be indexed under each recognized entity. The index module 330 may store the results of the indexing in a data store (not shown).

The device interaction module 340 manages the communications between the server 120 and the user device 110. Specifically, the device interaction module 340 receives documents from locations such as the web server 130, the message server 140, or other locations on the network 101, to be sent to the user device 110. In one embodiment, the device interaction module 340 also receives metadata identifying recognized entities referenced in the documents from the entity recognition engine 320. The device interaction module 340 also receives data from the user device 110 for subsequent processing by the server 120.

The gazetteer management interface 350 provides an interface (e.g., an application programming interface (API)) for interested third-parties to create and manage gazetteers. A third-party (e.g., a person, an organization) can create, maintain, and/or publish gazetteers by communicating with the server 120 through the interface. For example, an organization that provides information about movies may provide a gazetteer designed to recognize movie names and provide related facts (e.g., actor/actress/director names, show times, ticket information) through the interface for the entity recognition engine 320 to recognize movie names in users' documents. By allowing third-parties to create, maintain, and publish gazetteers that may be dynamically updated and used to recognize entity references and provide associated facts, the gazetteer management interface 350 promotes a development community for enhancing the ability to correctly recognize more specialized entities for users. For example, organizations and communities can create or customize gazetteers to recognize entities that are specific to them, and share such gazetteers among their members or the public. Because the entity recognition model can use updated (or new) gazetteers without being retrained, such updated (or new) gazetteers can be immediately applied to recognize entities and provide associated facts to users.

Users can also explicitly select a library of gazetteers to be applied to their documents through the gazetteer management interface 350. For example, if a user is interested in movies and information about a particular medical field, that user may select gazetteers developed to recognize movie names (or actors/actresses/developers) and terms in that medical field. As a result, the entity recognition engine 320 will use these gazetteers (among other gazetteers selected by the gazetteer selection module 324) to recognize entity references for the user.

In one embodiment, users are required to setup user accounts (e.g., with the server 120). As a part of the user's account management, a list of gazetteers is provided for the user to choose from. Gazetteer providers may submit gazetteers or references to gazetteers to the server 120 for inclusion in the list of gazetteers. In another embodiment, users can provide a reference (e.g., the URL of a data file containing the gazetteer data) to any publicly available gazetteer in order to have that gazetteer applied to the users' data, as long as the gazetteer is published in a supported format. Gazetteer providers may also selectively avail their gazetteers only to certain users, groups of users, or users with certain access, in which case a user would have to provide his security credentials in order to add the gazetteer to his account. A gazetteer may be optionally cryptographically signed—the presence of an authorized cryptographic signature may enable or disable specific gazetteer features (e.g., supplemental facts). A gazetteer may also require a user to establish a secured user authentication before using (or selecting) the gazetteer.

The gazetteer update module 360 updates contents of gazetteers (e.g., reference lists, associated facts, entity schemas) as specified by the gazetteers or their developers. Due to different time sensitiveness of different types of entities, gazetteers for different entity types have different update frequencies. For entities that rarely change, such as the fifty states in the U.S., gazetteers designed to recognize such entities can be configured to be rarely updated, only updated upon demand, or static (i.e., no update). For entities with high time sensitiveness, such as recent celebrities, politicians, and Fortune 500 companies, associated gazetteers can be configured to be updated frequently (e.g., daily or weekly). For entities with rapid dynamics, such as people with active interactions with a user, associated gazetteers can be configured to be updated with even higher frequency (e.g., every minute) or constantly. By updating contents of the gazetteers, the updated gazetteers can be used to recognize new entities such as current public figures and to provide updated facts. Because the entity recognition model can use updated gazetteers at runtime without having to be retrained, the updated gazetteer content can immediately come into effect in recognizing entity references.

The updated content can be pushed to or pulled by the gazetteer update module 360 using techniques such as publishing, uploading, and importing. A gazetteer may include parameters that specify the timing (e.g., frequency) and manner (e.g., source of the updated content, update content are pushed to or pull by the hosting server) that the gazetteer is to be updated. A gazetteer (or the gazetteer developer) may also specify a set of update rules for the gazetteer update module 360 to update the gazetteer's content. For example, a user-specific people name gazetteer may specify that people names in email headers of new emails be added to the reference list in order to capture people type entities not in the user's contacts.

Example Methodology of Recognizing Entities

Figure 4:
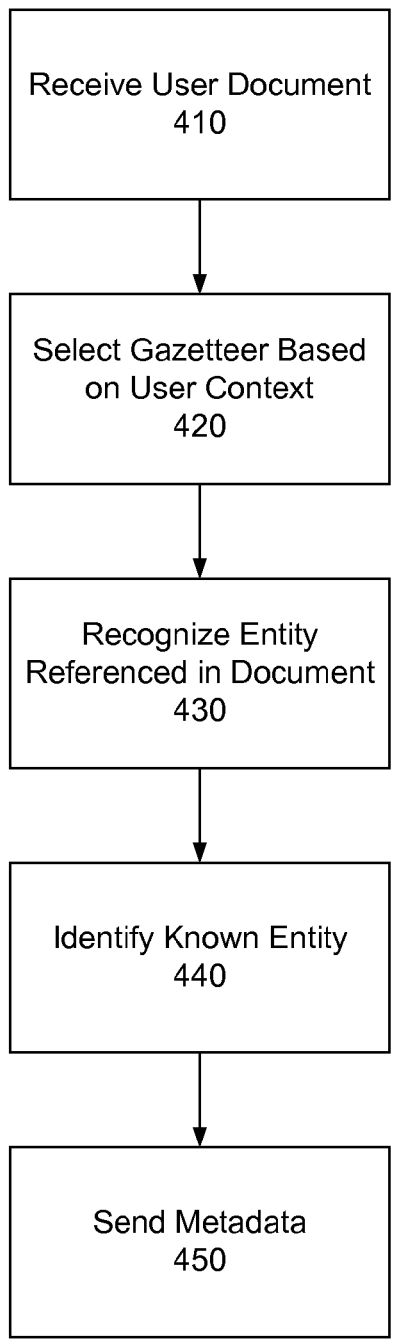
FIG. 4 is a flow chart illustrating a method of recognizing entities referenced in a document, in accordance with one embodiment.

FIG. 4 is a flow chart illustrating a process 400 of recognizing entities referenced in a document, in accordance with one embodiment. Other embodiments can perform the steps of the process 400 in different orders. Moreover, other embodiments can include different and/or additional steps than the ones described herein.

In step 410, a user document is received for recognizing entities referenced therein. For example, the server 120 may receive an email from a message server 140 via the network 101, destined for a user device 110.

In step 420, a set of gazetteers are selected based on user contexts. For example, the server 120 may determine a device location of the user device 110 and select gazetteers related to that location. The server 120 may also select user-specific gazetteers for the user and gazetteers related to organizations the user is affiliated with. The server 120 also selects some general gazetteers and gazetteers selected by the user. The selected gazetteers may be updated at runtime and the updated gazetteer content is used to recognize entity references.

In step 430, the server 120 analyzes the user document using the selected gazetteers according to the entity recognition model to recognize entities referenced in the user document. The server 120 may also apply filter rules while using the selected gazetteers. The server 120 also determines the entity types for the recognized entity references.

In step 440, the server identifies known entities associated with the recognized entity references (e.g., by matching with entity models), and retrieves facts associated with the entity and applicable actions from sources such as the entity model and a gazetteer including the entity reference.

In step 450, metadata associated with the recognized entity (e.g., the entity reference, entity type, applicable actions, associated facts) are sent to the user device 110 to enable the user to perform the applicable actions against the recognized entity on the user device 110.

ADDITIONAL EMBODIMENTS

In one embodiment, the entity recognition occurs on the user device 110 instead of (or in addition to) the server 120. For example, a light-weight version of an entity recognition engine 320 may be installed in the user device 110 as a web browser plug-in. The plug-in recognizes entities referenced in web pages displayed on the web browser and provides applicable actions against the recognized entity references.

In one embodiment, the referencing lists of gazetteers can also be used as white lists of entity names to validate the entity references identified by the entity recognition engine.

In one embodiment, the referencing list of a gazetteer can be used as an exact list of strings to be extracted as entity references, rather than as simply one feature in a trained entity recognition model. In this embodiment, any string found in text matching a reference name in a gazetteer and passing the associated filter rules for the gazetteer would be marked as a reference to an entity of the corresponding type with the corresponding facts.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for recognizing an entity referenced in a document using dynamically updated and/or personalized gazetteers. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of recognizing entities referenced in a document, the method comprising:
   receiving a document associated with a user;
   selecting at least one gazetteer from a plurality of gazetteers based on a context related to the user or the document;
   analyzing the document using the selected gazetteer according to an entity recognition model to recognize an entity referenced therein, the entity recognition model having been trained to recognize entities referenced in a training corpus using the plurality of gazetteers as features, wherein the selected gazetteer has been modified responsive to the training; and
   retrieving one or more facts associated with the recognized entity for providing the user with applicable actions against the recognized entity using the facts.

2. The method of claim 1, wherein the selected gazetteer includes a plurality of terms associated with a referencing fact used to reference entities of an entity type.

3. The method of claim 1, wherein the selected gazetteer comprises an entity schema for an associated entity type, the entity schema specifying one or more facts associated with entities of the entity type.

4. The method of claim 3, wherein the entity schema comprises facts of one or more entities of the entity type.

5. The method of claim 1, wherein the selected gazetteer includes a filter rule for reducing false positive entity recognition, and wherein the analyzing step comprises:
applying the filter rule for analyzing the document using the selected gazetteer.

6. The method of claim 1, wherein the selected gazetteer has been modified by personalizing the selected gazetteer for the user using personal data of the user after the entity recognition model is trained.

7. The method of claim 1, wherein the selected gazetteer is specified by the user.

8. The method of claim 1, wherein the related context comprises at least one of the following geographic location contexts: a location of a user device associated with the document and the user, a location appearing in the document, and a location specified by the user, and wherein the selecting step comprises:
selecting a gazetteer associated with one of the geographic location contexts.

9. The method of claim 1, wherein the related context comprises a social context, and wherein the selecting step comprises:
selecting a user-specific gazetteer of the user or a gazetteer associated with an organization affiliated with the user.

10. The method of claim 1, wherein the analyzing step comprises:
parsing the document for a presence of a term in a list of terms in the selected gazetteer; and
responsive for detecting a presence of a term in the list of terms, determining that an entity corresponding to the term is referenced in the document.

11. The method of claim 1, wherein the entity comprises one of the following: a people type entity, an organization type entity, and a location type entity.

12. The method of claim 1, wherein the selected gazetteer is published by a third party and selected by the user for recognizing entity references in documents associated with the user.

13. The method of claim 12, wherein the selected gazetteer comprises a collection of data comprising names and aliases of a plurality of entities, a plurality of definitions for actions applicable to the plurality of entities, a plurality of filter rules to be applied to possible matches for the names and aliases of the plurality of entities, and a plurality of graphic elements for presenting the plurality of entities.

14. The method of claim 12, wherein the third party avails the selected gazetteer only to users with security credential.

15. A non-transitory computer-readable storage medium storing executable computer program instructions for recognizing entities referenced in a document, the computer program instructions comprising instructions for:
receiving a document associated with a user;
selecting at least one gazetteer from a plurality of gazetteers based on a context related to the user or the document;
analyzing the document using the selected gazetteer according to an entity recognition model to recognize an entity referenced therein, the entity recognition model having been trained to recognize entities referenced in a training corpus using the plurality of gazetteers as features, wherein the selected gazetteer has been modified responsive to the training; and
retrieving one or more facts associated with the recognized entity for providing the user with applicable actions against the recognized entity using the facts.

16. The non-transitory computer-readable storage medium of claim 15, wherein the selected gazetteer includes a plurality of terms associated with a referencing fact used to reference entities of an entity type.

17. The non-transitory computer-readable storage medium of claim 15, wherein the selected gazetteer comprises an entity schema for an associated entity type, the entity schema specifying one or more facts associated with entities of the entity type.

18. The non-transitory computer-readable storage medium of claim 17, wherein the entity schema comprises facts of one or more entities of the entity type.

19. A system for recognizing entities referenced in a document, the system comprising:
a non-transitory computer-readable storage medium comprising computer program code, the computer program code including instructions for:
a device interaction module for receiving a document associated with a user;
a gazetteer selection module for selecting at least one gazetteer from a plurality of gazetteers based on a context related to the user or the document; and
an entity recognition engine configured for analyzing the document using the selected gazetteer to recognize an entity referenced therein, the entity recognition engine having been trained to recognize entities referenced in a training corpus using the plurality of gazetteers as features, the selected gazetteer having been modified responsive to the training, wherein the entity recognition engine is further configured for retrieving one or more facts associated with the recognized entity for providing the user with applicable actions against the recognized entity using the facts; and
one or more processors for executing the computer program code.

* * * * *

UNITED STATES PATENT AND TRADEMARK OFFICE
CERTIFICATE OF CORRECTION

PATENT NO. : 8,429,099 B1
APPLICATION NO. : 12/904957
DATED : April 23, 2013
INVENTOR(S) : Michael Perkowitz et al.

It is certified that error appears in the above-identified patent and that said Letters Patent is hereby corrected as shown below:

In the Claims:

Column 13, line 29, delete "responsive for," and insert -- responsive to --.

Signed and Sealed this
Tenth Day of September, 2013

Teresa Stanek Rea
*Acting Director of the United States Patent and Trademark Office*